United States Patent
Bae et al.

(10) Patent No.: US 10,367,340 B2
(45) Date of Patent: Jul. 30, 2019

(54) ASSEMBLY CABLE TRAY USING RETARDANT PLASTICS AND JOINT DEVICE THEREOF

(71) Applicant: POLISYS CO., LTD., Gyeongsangbuk-do (KR)

(72) Inventors: Hyungseong Bae, Gyeongsangbuk-do (KR); Sang Hun Lee, Gyeongsangbuk-do (KR)

(73) Assignee: POLISYS CO., LTD., Gyeongju (KR)

( * ) Notice: Subject to any disclaimer, the term of this patent is extended or adjusted under 35 U.S.C. 154(b) by 342 days.

(21) Appl. No.: 14/322,816

(22) Filed: Jul. 2, 2014

(65) Prior Publication Data

US 2015/0008295 A1 Jan. 8, 2015

(30) Foreign Application Priority Data

Jul. 2, 2013 (KR) .......................... 10-2013-0077328
Jul. 3, 2013 (KR) .......................... 10-2013-0077776

(51) Int. Cl.
| | |
|---|---|
| *F16L 3/133* | (2006.01) |
| *H02G 3/06* | (2006.01) |
| *H02G 3/04* | (2006.01) |

(52) U.S. Cl.
CPC ......... *H02G 3/0608* (2013.01); *H02G 3/0412* (2013.01)

(58) Field of Classification Search
CPC .................................................. H02G 3/0608
USPC ............ 248/58, 60, 68.1; 312/245; 403/341, 403/306, 293; 292/137, 145, 292, 150; 174/24, 68.1, 47, 72 R, 68.3
See application file for complete search history.

(56) References Cited

U.S. PATENT DOCUMENTS

| | | | | |
|---|---|---|---|---|
| 3,035,800 A | * | 5/1962 | Ward ................... | H02G 3/0608 248/68.1 |
| 3,053,358 A | * | 9/1962 | Gross ..................... | F16G 13/16 182/164 |
| 5,580,014 A | * | 12/1996 | Rinderer .............. | H02G 3/0456 174/68.1 |

(Continued)

FOREIGN PATENT DOCUMENTS

| | | |
|---|---|---|
| KR | 20-0300960 | 1/2003 |
| KR | 10-1241258 | 3/2013 |

(Continued)

*Primary Examiner* — Terrell L McKinnon
*Assistant Examiner* — Michael McDuffie
(74) *Attorney, Agent, or Firm* — Maschoff Brennan (57) ABSTRACT

A knockdown cable tray made of a fire-retardant plastic and a coupling device therefor are capable of being used to easily and efficiently install an incombustible knockdown cable tray to suspend a plurality of cables from a ceiling. The knockdown cable tray includes: a pair of side panels, each of which includes a frame having a plurality of coupling holes formed in opposite ends thereof in a lengthwise direction and a coupler protruding outwardly from the frame, the side panels being located opposite each other; a plurality of rung members, each of which is detachably coupled to the couplers and firmly supports the side panels; and coupling devices, each of which is detachably coupled to the coupling holes of each frame and firmly couples a plurality of side panels disposed in a lengthwise direction.

17 Claims, 9 Drawing Sheets

(56) References Cited

U.S. PATENT DOCUMENTS

| | | | | |
|---|---|---|---|---|
| 6,402,418 B1* | 6/2002 | Durin | H02G 3/0443 | 403/309 |
| 6,424,779 B1* | 7/2002 | Ellison | G02B 6/4459 | 385/134 |
| 6,810,191 B2* | 10/2004 | Ferris | G02B 6/4459 | 174/68.3 |
| 7,029,195 B2* | 4/2006 | Nault | H02G 3/0608 | 248/68.1 |
| 7,044,509 B2* | 5/2006 | Radel | E05B 63/128 | 292/106 |
| 7,132,602 B1* | 11/2006 | Komiya | H02G 11/006 | 174/70 R |
| 7,315,680 B1* | 1/2008 | Rapp | G02B 6/4459 | 248/68.1 |
| 7,448,702 B2* | 11/2008 | Chen | G06F 1/181 | 292/150 |
| 7,476,801 B1* | 1/2009 | Davis | E04F 15/0247 | 108/108 |
| 7,542,650 B2* | 6/2009 | Ellison | G02B 6/4459 | 248/49 |
| 7,546,987 B2* | 6/2009 | Sinkoff | H02G 3/0443 | 248/68.1 |
| 8,119,913 B2* | 2/2012 | Sonotsu | B60R 16/0215 | 174/101 |
| 8,193,448 B2* | 6/2012 | Syed | G06F 1/18 | 174/68.1 |
| 2003/0015627 A1* | 1/2003 | Van Scoy | F16G 13/16 | 248/49 |
| 2003/0095829 A1* | 5/2003 | Ferris | G02B 6/4459 | 403/293 |
| 2010/0086348 A1* | 4/2010 | Funahashi | H02G 3/0456 | 403/306 |
| 2011/0013978 A1* | 1/2011 | Smith | H02G 3/0608 | 403/306 |

FOREIGN PATENT DOCUMENTS

| | | |
|---|---|---|
| KR | 10-1242050 | 3/2013 |
| KR | 10-1266585 | 5/2013 |

* cited by examiner

ASSEMBLY CABLE TRAY USING RETARDANT PLASTICS AND JOINT DEVICE THEREOF

CLAIM OF FOREIGN PRIORITY

The present application claims priority to Korean Application No. 10-2013-0077328, filed Jul. 2, 2013, and Korean Application No. 10-2013-0077776, filed Jul. 3, 2013, which applications are incorporated herein by reference.

FIELD OF THE INVENTION

The present invention relates, in general, to a knockdown cable tray made of a fire-retardant plastic and, more particularly, to a knockdown cable tray made of a fire-retardant plastic, in which the cable tray can be easily and efficiently installed to support a plurality of cables, and can be easily changed in position after being installed and while in use.

BACKGROUND OF THE INVENTION

Cable trays are used to install a plurality of cables, and refer to supports made of an incombustible material or a metal.

Such a cable tray is utilized to install cables and is configured to enable the hanging of several cables from a ceiling at a designated position, thereby reducing the space taken by the installed cables, and ensuring easy installation of the cables.

When used, numerous cable trays are typically connected in a lengthwise direction according to a choice of a user. In this case, a coupling device for the cable tray is used to firmly couple the cable trays together.

For example, in Korean Patent No. 10-1241258 (published on Mar. 4, 2013), a conventional cable tray is made up of a pair of frames 10 and supports that are connected inside the frames 10 so as to be perpendicular to the frame 10 and firmly restrain the installed frames 10.

Further, in Korean Patent No. 10-1266585 (published on May 15, 2013), such a cable tray is made up of a pair of side frames 11 and connecting members 20 for connecting the side frames 11 in a lengthwise direction. To conveniently install the cable tray at a desired position, various coupling devices capable of firmly connecting the cable trays are provided, as in Korean Utility Model Registration No. 20-2003-00960 (published on Jan. 2, 2003) and Korean Patent No. 10-1242050 (published on Mar. 5, 2013).

However, in the case of the conventional cable tray and its coupling device, when the cable trays are to be connected in a lengthwise direction, they are fastened with bolts and nuts. As such, it is difficult to install and separate the cable tray and its coupling device, and to change an installed position and shape such as to enlarge or relocate the cable tray after the cable tray has been installed.

Further, the conventional cable tray and its coupling device are configured such that, in the case of connecting the frames, the nuts and bolts are coupled to a separate fixture. As such, the coupling process is complicated. When the fixture is damaged, it is difficult to replace a damaged component.

Furthermore, the conventional cable tray and its coupling device are not provided in such a way that a user can easily assemble and use them. Thus, the process of installing the cable tray is complicated. The conventional cable tray and its coupling device are generally formed of an incombustible metal material. In view of the characteristic of the cable tray formed of the metal material, it is difficult to provide cable trays having various colors. Additionally, due to weight of the metal material, it is difficult to efficiently perform processes such as transportation, assembly, and installation.

SUMMARY OF THE INVENTION

Accordingly, the present invention has been made keeping in mind the above problems occurring in the related art, and an object of the present invention is to provide a knockdown cable tray made of a fire-retardant plastic and a coupling device therefor; in which, when the cable tray is to be installed and used for a plurality of cables, the cable tray capable of being easily coupled in a knockdown type is provided, so that it is possible to rapidly and easily install the cable tray, and to easily change a connecting structure of the cable tray while it is installed and being used.

Another object of the present invention is to provide a knockdown cable tray made of a fire-retardant plastic and a coupling device therefor, in which rung members connecting side panels of the cable tray are detachably configured in a knockdown type, so that it is possible to easily and efficiently install the cable in a simple coupling structure, and in which the side panels of the cable tray can be easily and efficiently installed on a fixing hanger installed from a ceiling by a T-shaped bolt insertion channel formed in a lower end of each side panel and a T-shaped bolt coupled to the T-shaped bolt insertion channel.

In addition, another object of the present invention is to provide a knockdown cable tray made of a fire-retardant plastic and a coupling device therefor, in which the coupling device is detachably assembled and coupled to side panels without using nuts and bolts to couple the coupling device connecting the side panels of the cable tray, so that it is possible to easily couple and use the coupling device.

In order to achieve the above objects, according to one aspect of the present invention, there is provided a coupling device for a knockdown cable tray made of a fire-retardant plastic, in which the cable tray includes side panels (100) installed to be opposite to each other, a plurality of rung members (200) detachably coupled inside the side panels (100) so as to firmly support the side panels (100), and the coupling devices (300) configured to connect the side panels (100) in a lengthwise direction, the coupling device (300) including: a main body (310) formed to fit into a lengthwise end of each side panel (100); and a connecting body (320) configured to firmly fix the main body (310) to one side of each side panel (100).

Further, according to another aspect of the present invention, there is provided a knockdown cable tray made of a fire-retardant plastic, which includes: a pair of side panels (100), each of which includes a frame (110) having a plurality of coupling holes (111) formed in opposite ends thereof in a lengthwise direction, and a coupler (120) protruding outwardly from the frame (110) and which are located to be opposite to each other; a plurality of rung members (200), each of which is detachably coupled to the couplers (120) and firmly supports the side panels (100); and coupling devices (300), each of which is detachably coupled to the coupling holes (111) of each frame (110) and firmly couples a plurality of side panels (100) disposed in a lengthwise direction, wherein the coupler (120) includes a connecting plate (121) protruding to one side of the frame (110), a fitting rib (122) protruding upwardly from the connecting plate (121) and formed in the lengthwise direction of the frame (110), and a T-shaped bolt insertion channel (123) formed in a lower end of the connecting plate (121).

Furthermore, according to another aspect of the present invention, there is provided a knockdown cable tray made of a fire-retardant plastic, which includes: a pair of side panels (100), each of which includes a frame (110), having a plurality of coupling holes (111) formed in opposite ends thereof in a lengthwise direction and a coupler (120) protruding outwardly from the frame (110), and which are located to be opposite to each other; a plurality of rung members (200), each of which is detachably coupled to the couplers (120) and firmly supports the side panels (100); and coupling devices (300), each of which is detachably coupled to the coupling holes (111) of each frame (110), and firmly couple a plurality of side panels (100) disposed in a lengthwise direction, wherein the coupler (120) further includes a fixing groove (124) formed in a portion connected to the frame (110) in the lengthwise direction of the frame (110), and each rung member (200) further includes hooking legs (220) that are formed at lengthwise opposite ends thereof so as to be capable of being inserted into the fixing grooves (124).

In addition, according to another aspect of the present invention, there is provided a knockdown cable tray made of a fire-retardant plastic, which includes: a pair of side panels (100), each of which includes a frame (110), having a plurality of coupling holes (111) formed in opposite ends thereof in a lengthwise direction, and a coupler (120) protruding outwardly from the frame (110), and which are located to be opposite to each other; a plurality of rung members (200), each of which is detachably coupled to the couplers (120) and firmly supports the side panels (100); and coupling devices (300), each of which is detachably coupled to the coupling holes (111) of each frame (110) and firmly couple a plurality of side panels (100) disposed in a lengthwise direction, wherein the frame (110) has a long plate shape, and further includes a cover fitting groove (112) formed at an upper side adjacent to the coupling holes (111) in a lengthwise direction; and the frame (110) further includes a tray cover (500) at an upper portion thereof so as to be detachably coupled to the cover fitting groove (112).

According to the present invention, the following effects can be obtained.

First, the cable tray can be easily coupled and used to allow the cable(s) to be suspended in a designated place on the basis of a knockdown configuration of the side panel, the rung member, and the coupling device without an unnecessary coupling by way of using nuts and bolts. Thus, it is possible to increase the entire installation and construction efficiency of the cable tray.

Second, when used to suspend the cable(s), the installed side panels, rung members, and coupling device are configured to be able to be coupled in a knockdown type. Thus, when the cable tray is to be installed, as well as when the cable tray is to be enlarged or relocated in an installed state, the cable tray can be efficiently installed.

Third, the side panels, the rung members, and the coupling device, all of which are formed in a knockdown type, can be easily coupled without a complicated configuration. When any one of the side panel, the rung member, or the coupling device is damaged, the damaged component can be replaced in an easy, rapid way. Thus, easy and long-term use is possible without replacing all the components, so that an effect of reducing installation expenses and cost can be obtained.

Fourth, the side panels and the coupling device are easily configured in a detachably coupled structure. Thus, it is possible to provide a coupling technique that is easier and more stable than a conventional coupling technique using nuts and bolts. Especially, the structural simplification makes it possible to reduce material expenses and increase product quality.

Fifth, a position of the installed side panel can be adjusted to slide along the T-shaped bolt coupled to a fixing hanger. Thus, the positions of the side panels can be adjusted without the trouble of separating and re-installing the whole of the installed cable tray, and the cable tray can be efficiently enlarged or relocated. Accordingly, the work time needed for such modifications, and expenses related thereto can be prevented due to the current invention.

Sixth, the side panel, the rung member, and the coupling device are formed of a high-strength plastic having fire retardancy and innoxiousness. Thereby, when installing the cable tray, work efficiency is prevented from being reduced due to the use of the non-metal material. In the case of coloring the cable tray, materials of various colors can be easily mixed to manufacture the cable tray. Thus, cable trays having various colors are prepared and can be selectively used according to a type of the cable, so that it is possible to visually supervise a construction field.

Seventh, the side panel, the rung member, and the coupling device are made of a high-strength plastic having fire retardancy and innoxiousness rather than an incombustible metal material. Thus, a higher cost saving effect can obtain as compared to the case of using the metal material, and a flexibility to cope with an environmental change in the installation place so as to allow the cable tray to be prevented from being damaged and to be stably used.

Eighth, since the side panel, the rung member, and the coupling device are formed of a high-strength plastic having fire retardancy, an earth connection, which is applied to the structure when a metal cable tray is installed, is not required. Thus, it is possible to prevent component installation expenses from being increased, and to obtain an effect of reducing the overall material expenses.

BRIEF DESCRIPTION OF THE DRAWINGS

The above and other objects, features, and other advantages of the present invention will be more clearly understood from the following detailed description when taken in conjunction with the accompanying drawings, in which.

DETAILED DESCRIPTION OF THE DRAWINGS

Hereinafter, a detailed description will be made of the present invention according to the attached drawings.

Prior to the description, an exemplary embodiment of the present invention will be described in detail with reference to the accompanying drawings. First, when inserting reference numerals into the components in the respective drawings, although the same components are illustrated in the different drawings, they are described to have the same reference numeral when possible. Further, technical terms, as will be mentioned hereinafter, are terms defined in consideration of their function in the present invention, which may be varied according to the intention of a user, practice, or the like, so that the terms should be defined based on the contents of this specification.

First, a configuration will be described according FIGS. 1 through 9.

The present invention includes: a pair of side panels 100, each of which is made of a frame 110 having a plurality of coupling holes 111 formed in opposite ends thereof in a lengthwise direction and a coupler 120 protruding outwardly from the frame 110; a plurality of rung members 200, each of which is detachably coupled to the couplers 120, and firmly supports the side panels 100; and coupling devices 300, each of which is detachably coupled to the coupling holes 111 of each frame 110, and firmly couples a plurality of side panels 100 disposed in a lengthwise direction.

First, a knockdown cable tray made of a fire-retardant plastic according to the present invention is coupled by the coupling device, and a configuration thereof will be described.

The side panels 100 are provided to fix the rung members 200 on which at least one cable 10 is suspended at a position at which the cable tray is to be installed. As in FIG. 7, in the case of installing a plurality of cables 10, the side panels 100 are configured to guide a running direction of the cables 10 such that the cables 10 are installed between the side panels 100, to be able to maintain a firmly installed position, and to prevent the installed cables 10 from being damaged by outward exposure.

In the present invention, each side panel 100 is formed of a high-strength plastic having fire retardancy and innoxiousness. Side panels, which are installed to be opposite to each other by a worker, that are made of a metallic material are heavy and the installation process is inefficient. Side panels 100 formed of a plastic material are lightweight, provide beautiful and accommodating geometry, and can be efficiently installed.

Further, since each side panel 100 is formed of a high-strength plastic having fire retardancy and innoxiousness, it is possible to flexibly cope with an environmental change at a place where the side panels 100 are installed, and prevent a problem such as corrosion that may occur when using metallic side panels, which leads to long-term stability of the cable tray.

In the case of using metallic side panels, there occurs a problem that the metallic side panel's outside, inside, or both may be corroded over time. As such, the present invention improves this problem so as to enable the side panel to be permanently installed and used.

Further, as described above, each side panel 100 is made of the frame 110, having the plurality of coupling holes 111 in the opposite ends thereof in the lengthwise direction and the coupler 120 protruding outwards from the frame 110, and is configured to detachably couple the rung members 200 inside the frames 110, and to be detachably coupled outside the frames by T-shaped bolts 610 and a fixed support 2 connected through fixing pipes 1 and coupling nuts 3.

The frame 110 is preferably formed in a long plate shape, and further includes a cover fitting groove 112 formed in an upper portion thereof adjacent to the coupling holes 111 in a lengthwise direction.

Figure 1:
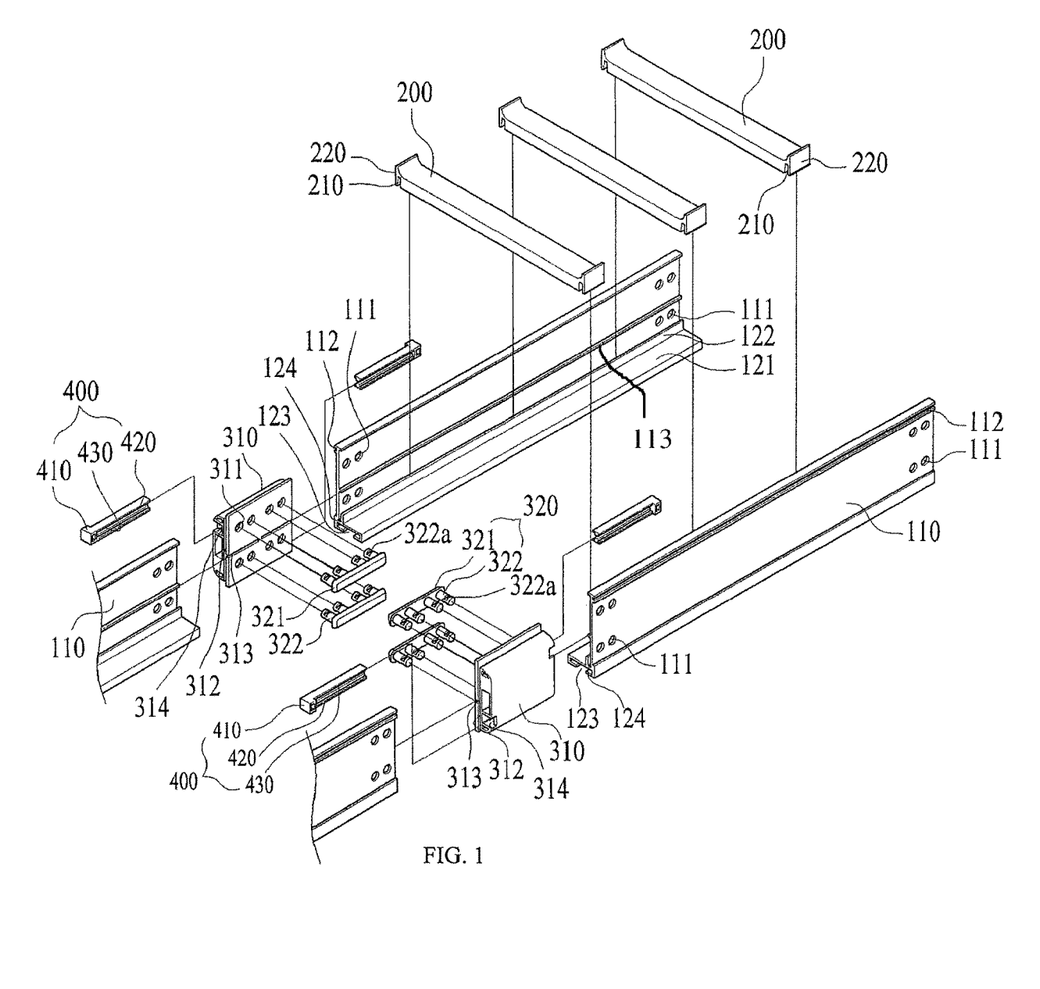
FIG. 1 is an exploded perspective view of a knockdown cable tray according to the present invention.
Figure 4:
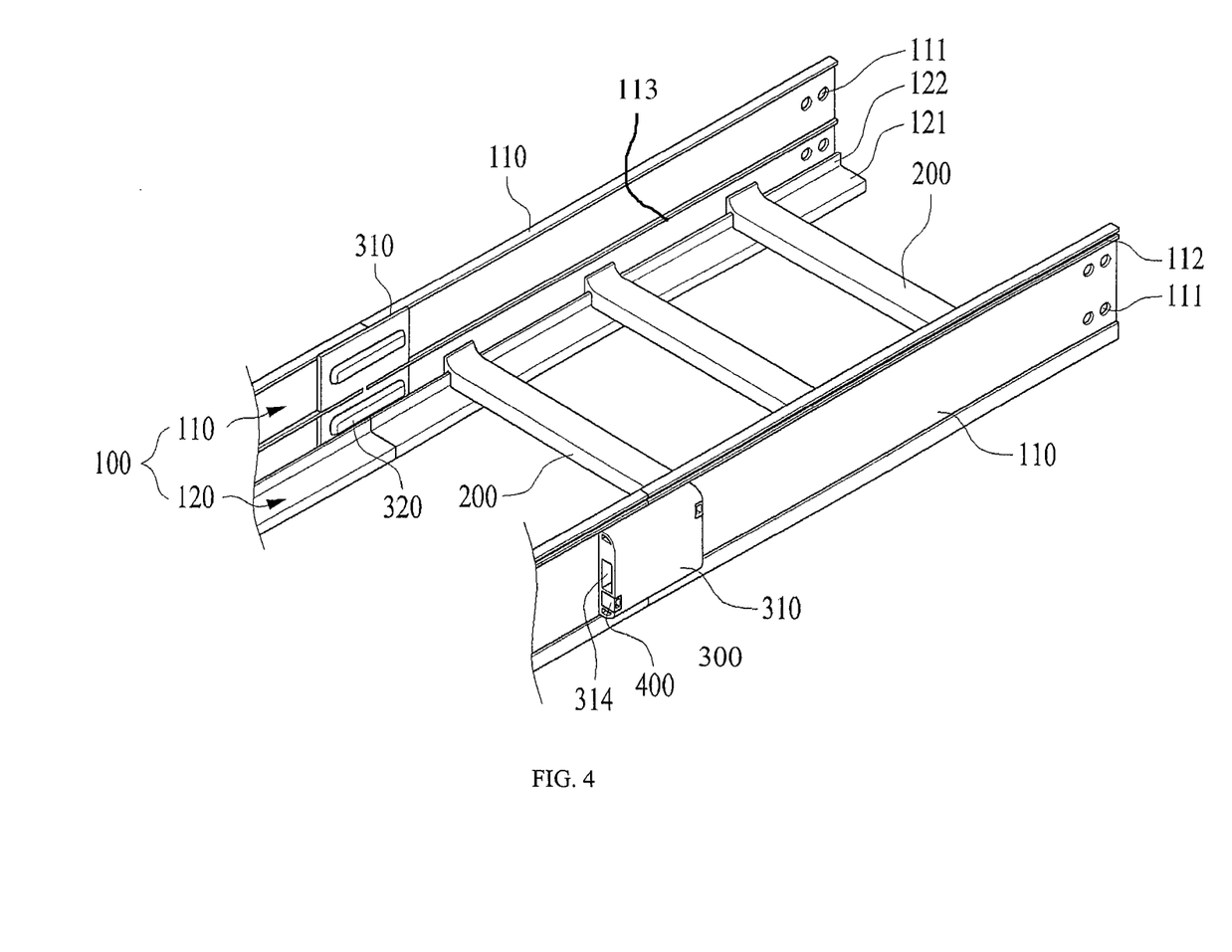
FIG. 4 is a perspective view showing a usable state in which the coupling device is coupled to the knockdown cable tray according to the present invention.
Figure 8:
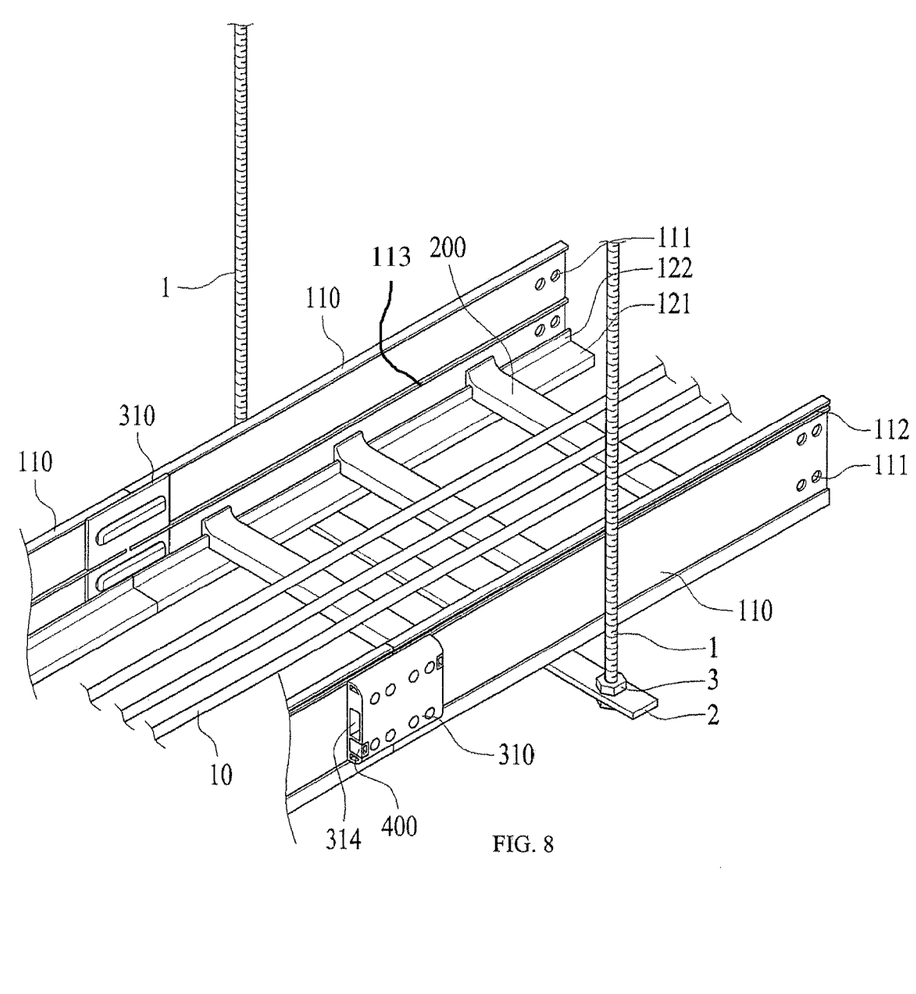
FIG. 8 shows a usable state in which the knockdown cable tray coupled by the coupling device is installed in accordance with the present invention.
Figure 9:
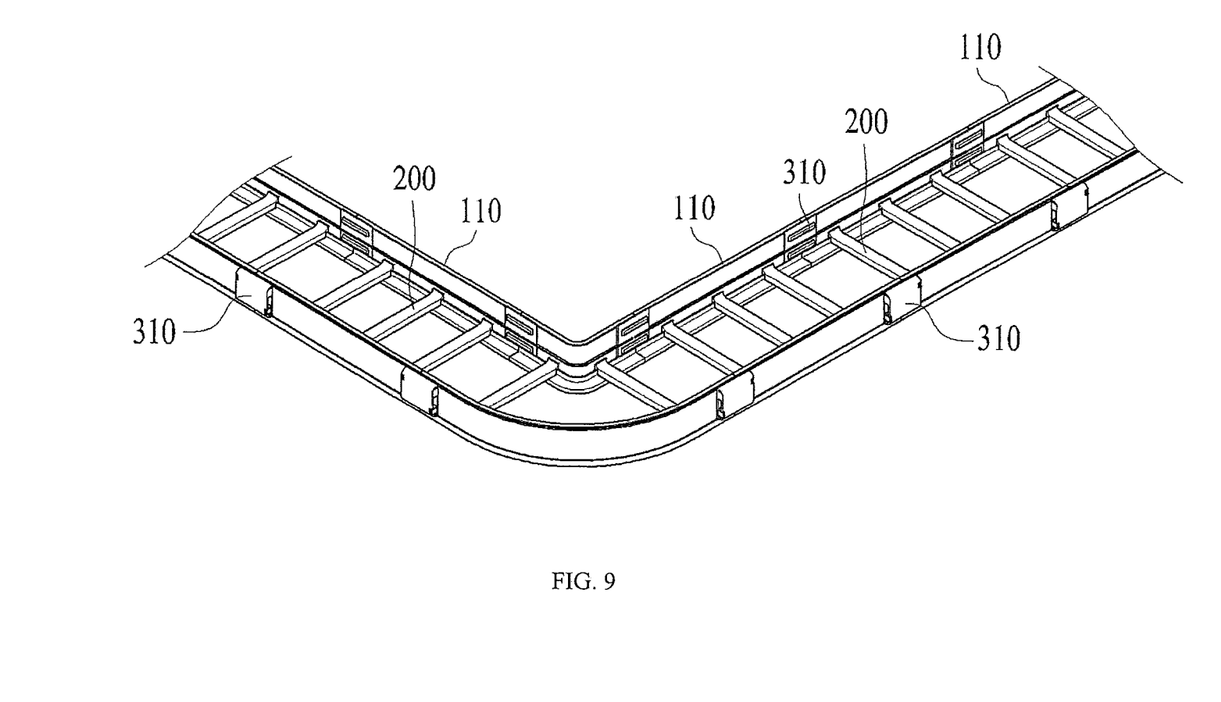
FIG. 9 shows a usable state in which a plurality of knockdown cable trays according to the present invention are connected by the coupling devices.

To be more specific, as shown in FIGS. 1 and 4, the frame 110 is formed in a long plate shape in a lengthwise direction. Thereby, as shown in FIGS. 8 and 9, the frame 110 can be continuously coupled via the coupling device 300 that is detachably fastened to the coupling holes 111 of the frame 110.

Further, a tray cover 500 is fitted into the cover fitting groove 112 formed on an upper side of the frame 110, so that, when the cable 10 is placed on the rung members 200 coupled inside the frame, the frame 110 and the rung members 200 can be firmly coupled, and the cable 10 installed inside can be prevented from being exposed outside.

Tray cover 500 is coupled to upper portions of the side panels 100 so as to prevent the cables 10, installed between the side panels 100, from being exposed outside. The tray cover 500 has the same shape and function as existing tray covers, and thus detailed description of the tray cover 500 will be omitted.

However, in the present invention, the tray cover 500 is formed of a high-strength plastic having fire retardancy and innoxiousness, thereby reducing a whole load or weight of the installed cable tray to allow the cable tray to be efficiently installed.

Further, the coupler 120 protrudes at one side of the frame 110 so as to be able to firmly fix the rung members 200 coupled inside the frame 110.

Here, the coupler 120 includes a connecting plate 121 protruding to one side of the frame 110, a fitting rib 122 protruding upwardly from the connecting plate 121 in the lengthwise direction of the frame 110, and a T-shaped bolt insertion channel 123 formed in a lower end of the connecting plate 121.

Figure 2:
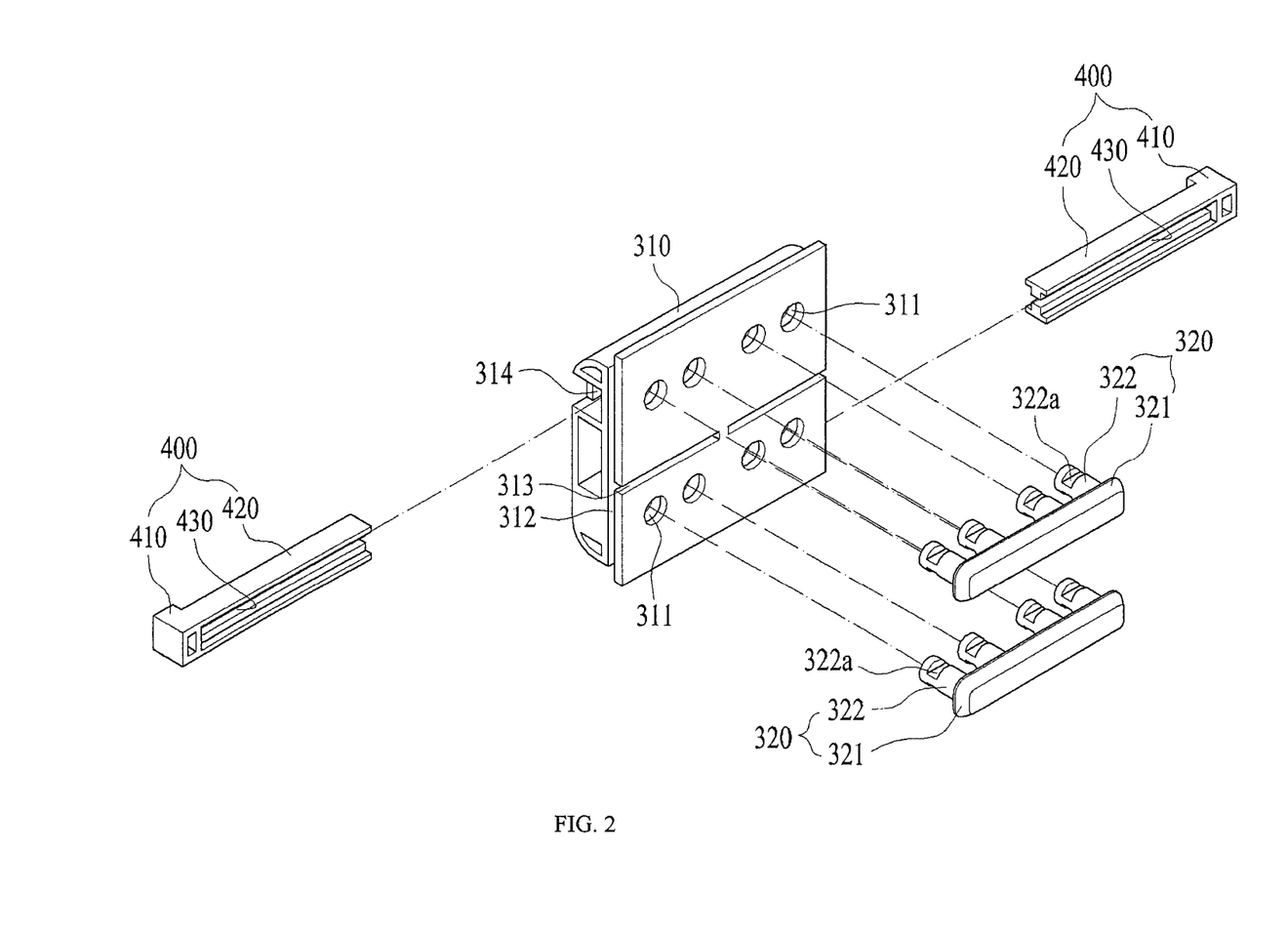
FIG. 2 is an exploded perspective view of a coupling device for the knockdown cable tray according to the present invention.

As shown in FIGS. 1 and 2, the connecting plate 121 protrudes at one side of the frame 110, and preferably protrudes inside the frames 110 opposite to each other in a direction perpendicular to the frame 110.

When the rung members 200 are coupled inside the frame 110 in order to install the plurality of cables 10, the plurality of rung members 200 can firmly restrain and support the pair of frames 110 opposite to each other through the connecting plates 121, as shown in FIG. 4.

Especially, for the purpose of more easily coupling the frame 110 and the rung members 200 as described above, the fitting rib 122 is provided for an upper surface of the connecting plate 121 protruding at one side of the frame 110, and each rung member 200 is provided with a coupling groove 210 so as to be able to be detachably coupled to the fitting rib 122, when the rung members 200 are coupled inside the frame 110.

Further, the fitting rib 122 is integrally formed on the upper surface of the connecting plate 121 so as to firmly support the rung members 200 coupled above the connecting plate 121. Thus, when the rung members 200 are detachably coupled to the fitting rib 122 at one side of the frame 110, the fitting rib 122 allows the rung members 200 to maintain a firmly coupled state.

Such coupling will be described in great detail. The rung members 200 are detachably coupled inside the frame 110, thereby firmly restraining the frames 110 opposite each other. When the cable 10 is installed inside the frames 110, the rung members 200 firmly support the cable 10 so as to allow the cable 10 to be smoothly installed inside the frames 10. Each rung member 200 has a long bar shape, and after being coupled inside the frame 110, is configured to prevent rotation or movement caused by movement of the cable 10 and easy release of the coupling with the frame 110.

Figure 6:
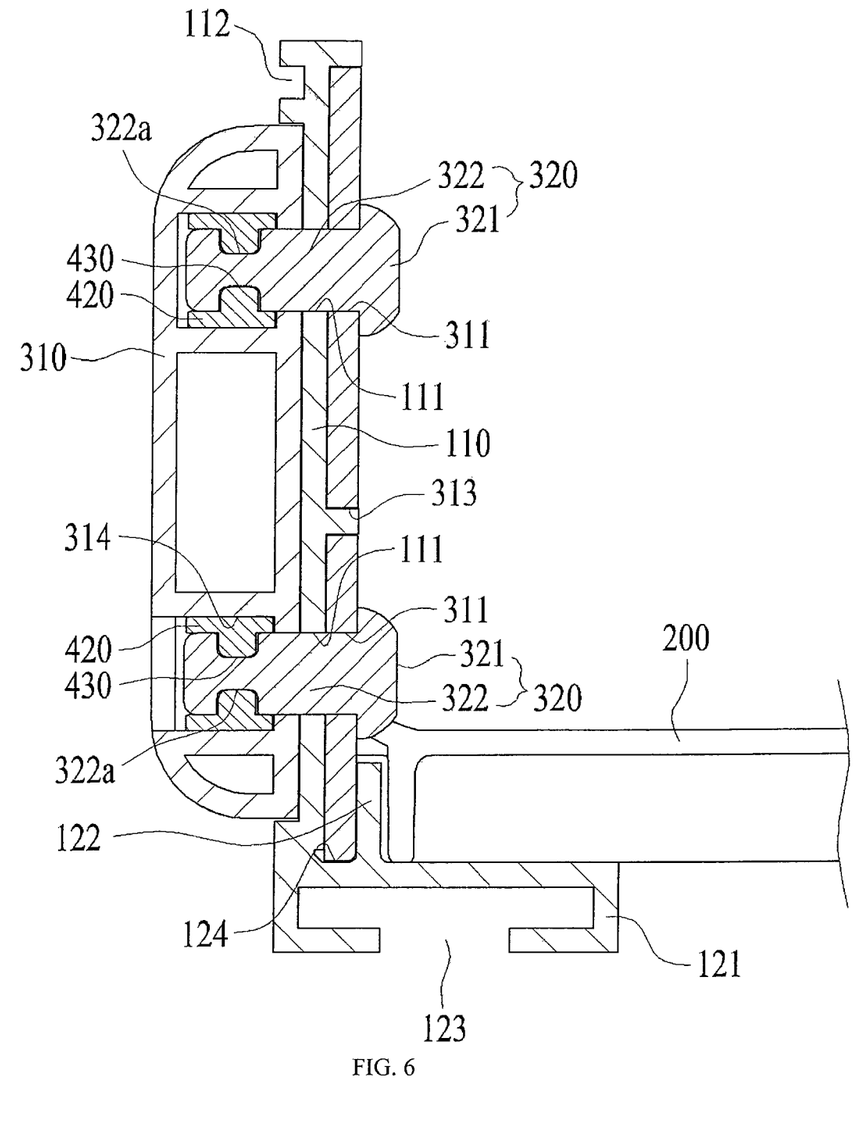
FIG. 6 is a cross-sectional view showing coupled key parts of the coupling device and a side panel for the knockdown cable tray according to the present invention.

In a state in which both lower ends of each rung member 200 are in close contact above the connecting plates 121 protruding inside the respective frames 110, the fitting rib 122, as shown in FIG. 6, is fitted into the coupling groove 210 of each rung member 200, so that the frames 110 and the rung members 200 are coupled in a mutually firmly restrained state.

Further, even in the case of the aforementioned coupling, the coupler 120 is further provided with a fixing groove 124 in a portion where the coupler 120 is connected to the frame 110 in the lengthwise direction of the frame 110, and lengthwise opposite ends of each rung member 200 are further provided with respective hooking legs 220 that can be inserted into the fixing grooves 124.

As shown in FIGS. 1 and 6, the fixing groove 124 is formed in the portion at which the frame 110 and the coupler 120 are connected in the lengthwise direction of the frame 110, and the hooking leg 220 is formed at a lower portion of each end of each rung member 200 coming into close contact with the frame 110 so as to protrude and be coupled to the fixing groove 124.

Thus, when the rung member 200 is detachably coupled to an upper side of the coupler 120 protruding at one side of the frame 110, the fitting rib 122 of the coupler 120 is fitted into the coupling groove 210 of the rung member 200, so that they can be firmly coupled to each other. The hooking leg 220 of the rung member 200 is fitted into the fixing groove 124 of the coupler 120. Thus, the rung member 200 and the coupler 120 can be more firmly coupled.

Especially, although not shown in detail in the present invention, the fitting rib 122 and the fixing groove 124 of the coupler 120 are formed in the lengthwise direction of the frame 110, and the coupling groove 210 and the hooking leg 220 of the rung members 200 can be guided along the fitting rib 122 and the fixing groove 124. Thereby, as shown in FIG. 4, even when the plurality of rung members 200 are coupled inside the frame 110, each rung member 200 can be coupled to the frame 110 while a user easily adjusts a position at which each rung member 200 is installed.

Accordingly, the rung members 200 can be easily detachably coupled inside the side panels 100 while the position of each rung member 200 coupled inside the side panels 100 is easily adjusted, so that easy and efficient work can be done when the installed cable tray is enlarged or relocated.

In other words, in the configuration of the knockdown cable tray made of a fire-retardant plastic according to the present invention, the installation of the cable tray based on the detachable coupling of the rung members 200 with the side panels 100 as well as the enlargement or the relocation work of the installed cable tray can be easily and efficiently done.

Figure 7:
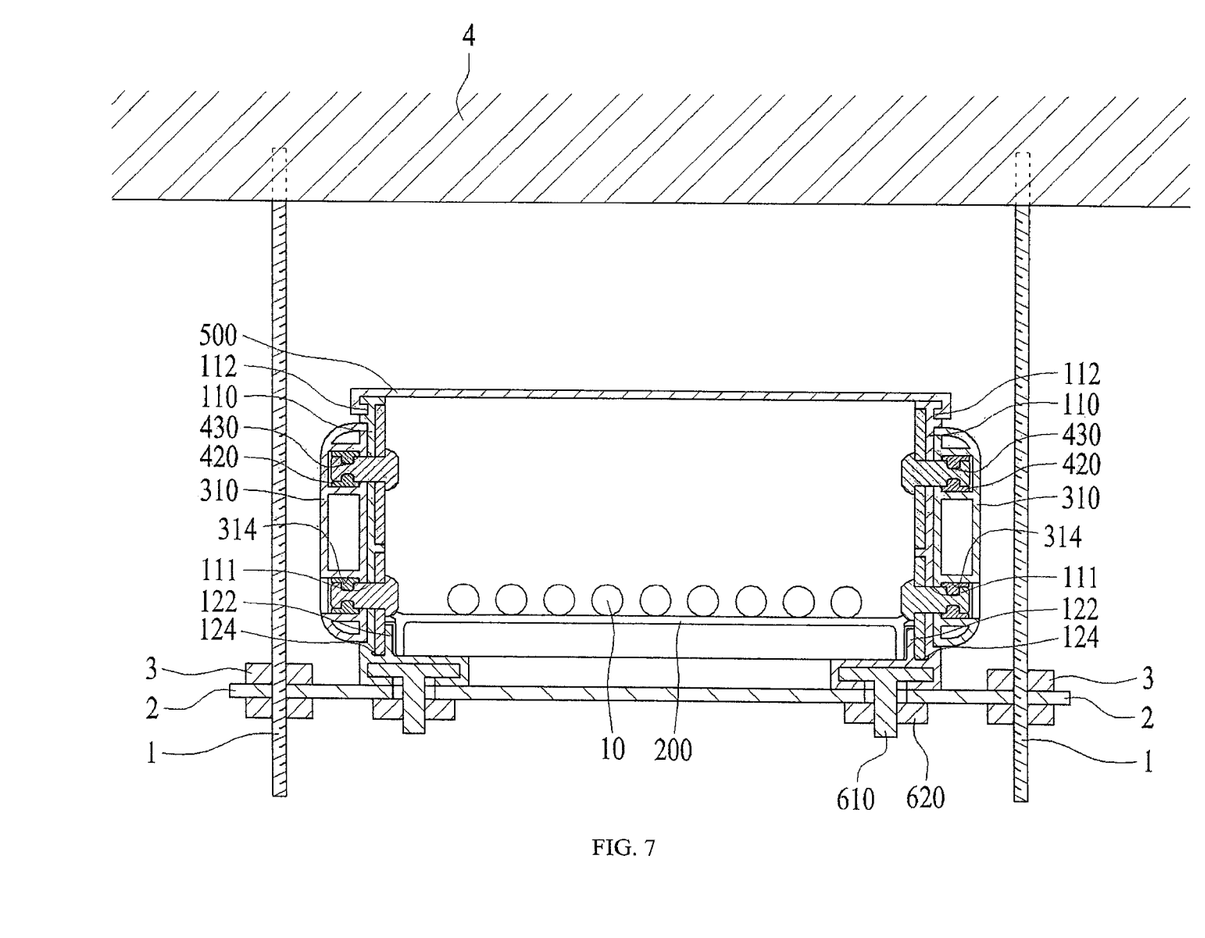
FIG. 7 is a side cross-sectional view showing a usable state in which the knockdown cable tray coupled by the coupling device is installed from a ceiling in accordance with the present invention.

Furthermore, as shown in FIGS. 7 and 8, in the case of suspending the cable tray from a ceiling 4, a lower end of the connecting plate 121 is provided with a T-shaped bolt insertion channel 123 into which a head of a T-shaped bolt 610, which is coupled to a fixed support 2 firmly fixed by coupling nuts 3 and fixing pipes 1 fixed to the ceiling 4, is inserted in order to easily couple the frames 110 above the fixed support 2.

As shown in FIGS. 4 through 7, with this configuration, when the cable tray of the present invention is installed at a desired position below the ceiling 4, the T-shaped bolt 610, whose head is coupled to the T-shaped bolt insertion channel 123 formed in the lower end of the connecting plate 121 of the coupler 120, is coupled to the fixed support 2 firmly fixed by the coupling nuts 3 and the fixing pipes 1 coupled to the ceiling 4, and thereby the frames 110, placed above the fixed support 2, are firmly coupled by the T-shaped bolts 610 connecting the fixed support 2 and the couplers 120.

As shown in FIG. 7, a coupling nut 620 is screwed onto a lower end of the T-shaped bolt 610 that is passing through the fixed support 2, so that a coupling force of the fixed support 2 and the frame 110 can be adjusted.

In the present invention, in such a coupled state, a user adjusts the coupling nut 620 coupling the fixed support 2 and the T-shaped bolt 610, so that a coupling force of the T-shaped bolt insertion channel 123 and the T-shaped bolt 610 coupled to the T-shaped bolt insertion channel 123 can be adjusted. Thus, the frame 110 can be displaced along the head of the T-shaped bolt 610 coupled to the T-shaped bolt insertion channel 123. Thus, when work such as the enlargement or relocation of the installed cable tray is carried out, it is not necessary to disassemble and reassemble the side panels 100, the rung members 200, and the coupling devices 300 of the cable tray coupled to the fixed support 2. Thus, the frame 110 of the side panel 100 is displaced along the head of the T-shaped bolt 610, and then the coupling nut 620 coupled to the lower end of the T-shaped bolt 610 is adjusted to firmly couple the T-shaped bolt insertion channel 123 and the T-shaped bolt 610. The cable tray is displaced to the desired position or location with the frames 110 and the fixed support 2 coupled firmly, and then the cable tray is easily reinstalled.

Meanwhile, the rung members 200 are formed of a high-strength plastic having fire retardancy and innoxiousness. Thereby, even when installed between the frames 110, the rung members 200 can be easily and efficiently coupled inside the side panels 100, and prevent an increase in overall weight of the installed cable tray, so that it is possible to increase efficiency with which the user installs the cable tray.

As shown in FIGS. 4 through 8, the coupling device 300 includes a main body 310, formed to fit in a lengthwise end of the side panel 100 so as to easily and efficiently couple the side panels 100 when a plurality of side panels 100 are to be installed in a lengthwise direction, and a connecting body 320 that firmly fixes the main body 310 at one side of the side panel 100. To be more specific, the main body 310 is provided with a plurality of connecting holes 311 corresponding to the coupling holes 111 of the frame 110, and is formed to fit in a lengthwise end of the frame 110. The connecting body 320 is coupled to the coupling holes 111 and the connecting holes 311, and fixes the main body 310 at one side of the frame 110.

As shown in FIG. 4, the main body 310 is installed to connect the plurality of frames 110 installed in a lengthwise direction. The lengthwise ends of the frames 110 are configured to be fitted into opposite sides of the main body 310, so that the plurality of frames 110 can be connected and mutually restrained in a lengthwise direction.

Figure 3:
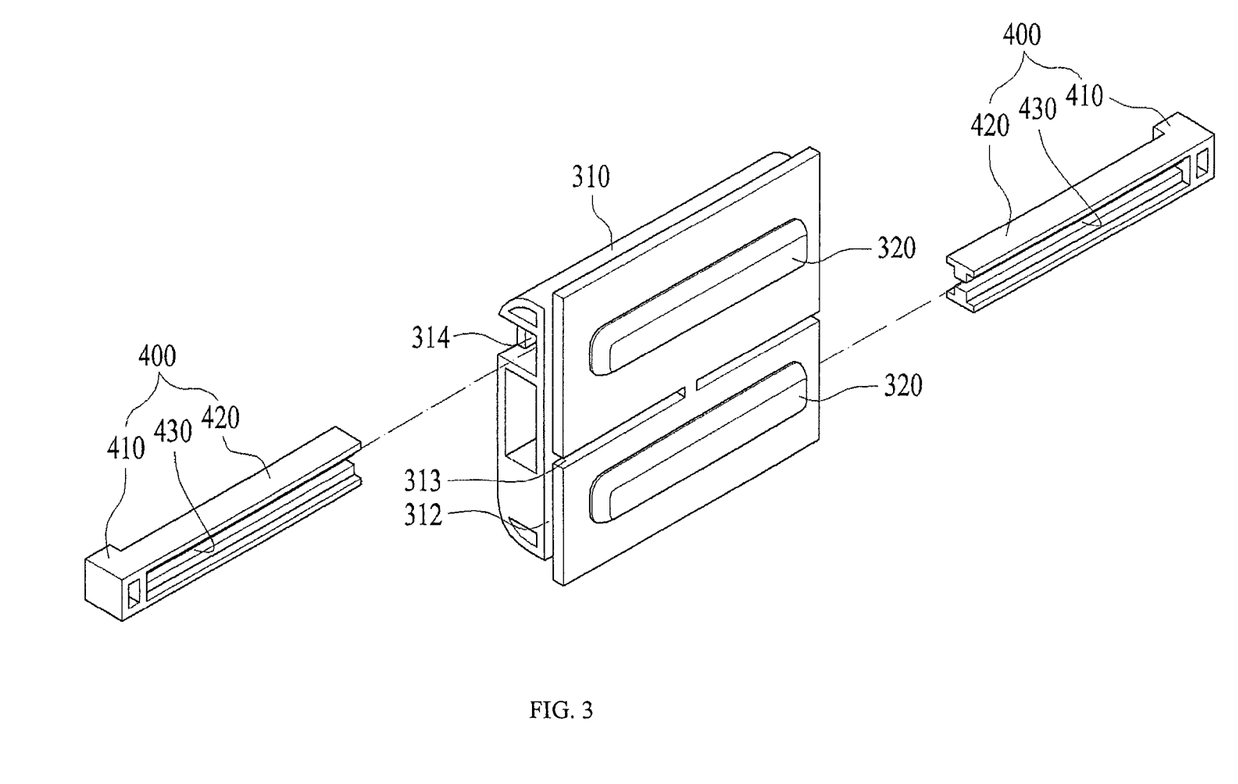
FIG. 3 is a perspective view showing a coupled state of the coupling device for the knockdown cable tray according to the present invention.

Further, as shown in FIGS. 1 through 3, the main body 310 is configured to form fitting slots 312 at opposite sides thereof in a lengthwise direction such that, as described above, the lengthwise ends of the frames 110 can be smoothly fitted into the main body 310.

With this configuration, as shown in FIG. 4, the main body 310 is coupled between the frames 110 to be connected in a lengthwise direction, so that the coupling of the connected frames 110 can be firmly maintained.

In the present invention, to firmly couple the frame 110 and the main body 310, the main body 310 includes guide slots 313 formed at one side thereof in a lengthwise direction so as to be perpendicular to the fitting slot 312, and the frame 110 includes a guide protrusion 113 that can be correspondingly fitted into the guide slot 313 and protrudes in a direction parallel to the coupler 120.

Figure 5:
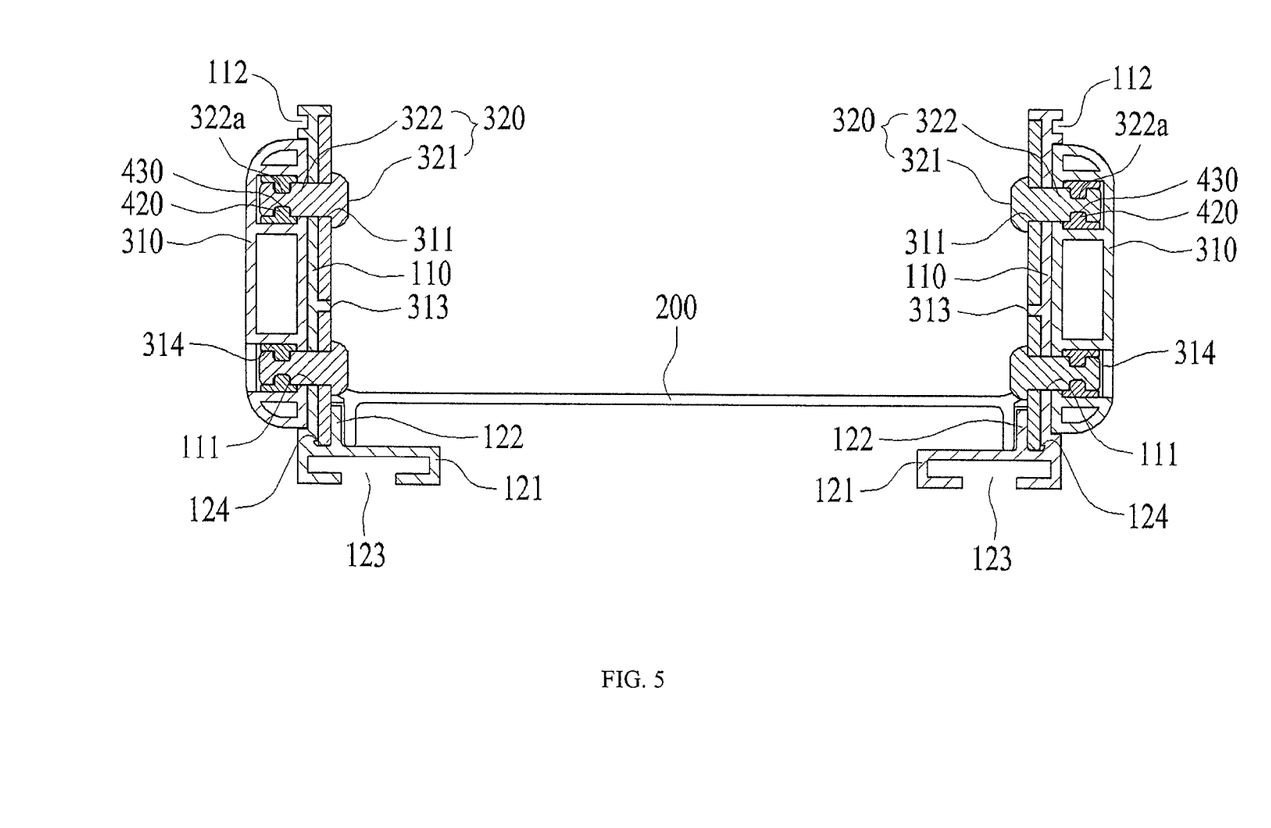
FIG. 5 is a side cross-sectional view showing the usable state in which the coupling device is coupled to the knockdown cable tray according to the present invention.

With this configuration, as shown in FIGS. 4 through 6, when the frame 110 and the main body 310 are coupled, the end of the frame 110 is fitted into the fitting slot 312 of the main body 310, and simultaneously the guide protrusion 113 of the frame 110 is slidably fitted into the guide slot 313. Thereby, the frame 110 and the main body 310 can be more firmly coupled.

In addition, to more firmly couple the frame 110 and the main body 310, the connecting body 320 couples to one side of the main body 310 and is configured to insert into the coupling holes 111 formed in the frame 110 and the connecting holes 311 formed in the main body 310. Thus, as shown in FIGS. 5 and 6, the main body 310 is configured to couple and be firmly fixed to one side of the frame 110.

To be more specific about such a configuration, as shown in FIGS. 2 and 3, the connecting body 320 includes a body part 321, which can be held with the hand of a user, and a plurality of connecting studs 322 that protrude at one side of the body part 321 and are fitted into the coupling holes 111 and the connecting holes 311 in a penetrated state.

Here, insofar as the user can smoothly seize the body part 321, the body part 321 may be variously modified in shape according to a choice of the user and convenience of use.

Further, the connecting studs 322 protrude at one side of the body part 321 so as to be able to be inserted into the coupling holes 111 and the connecting holes 311. As shown in FIGS. 5 to 7, after the coupling holes 111 of the frame 110 and the connecting holes 311 of the main body 310 are aligned with each other, the connecting studs 322 are coupled to the coupling holes 111 and the connecting holes 311 in a penetrated state, thereby preventing the coupling of the frame 110 and the main body 310 from being released.

Here, it is shown in the present invention that the connecting studs 322 protrude to one side of the body part 321. However, without being limited thereto, the connecting studs 322 may be variously modified in shape and configuration according to a choice of the user as long as they mutually restrain the coupling holes 111 and the connecting holes 311 so as to be able to firmly restrain the coupling of the frame 110 and the main body 310.

In addition, the main body 310 is further provided with insertion grooves 314 at one side thereof. Joint fixtures 400 are removably coupled to the respective insertion grooves 314.

The insertion grooves 314 are formed based on the lengthwise middle of the main body 310 so as to be opposite to each other in a vertical direction.

One insertion groove 314 is formed at one side of the main body 310 in a lower end of the main body 310, and the other insertion groove 314 is formed at the opposite side in an upper end of the main body 310. When the plurality of joint fixtures 400 are coupled to the insertion grooves 314 of the main body 310, the insertion grooves 314 are adapted to prevent the joint fixtures 400 from interfering with each other and to allow the joint fixtures 400 to be stably coupled.

Further, each joint fixture 400 is configured to allow the connecting studs 322, coupled to the coupling holes 111 and the connecting holes 311 in a penetrated state, to be fixed inside the main body 310. Each joint fixture 400 is thus coupled to the insertion groove 314 of the main body 310.

As shown in FIG. 3, the joint fixture 400 includes a bar-shaped fixing body 410, fixing protrusions 420 extending to one side of the fixing body 410 so as to correspond to each other, and a fitting slot 430 formed between the fixing protrusions 420.

To be more specific about the coupling of the joint fixture 400 and the main body 310, as shown in FIGS. 3 through 6, when the main body 310 is coupled to one side of the frame 110 in a lengthwise direction, the connecting studs 322 of the connecting body 320 are coupled to the coupling holes 111 of the frame 110 and the connecting holes 311 of the main body 310 in a penetrated state, and firmly restrain the coupling of the frame 110 and the main body 310. Simultaneously, as shown in FIGS. 4 through 6, the fixing protrusions 420 of the joint fixture 400 are coupled to the insertion groove 314 of the main body 310 and to the connecting studs 322 that pass through the coupling holes 111 and the connecting holes 311. Fixing protrusions 420 of the joint fixture 400 are located inside the main body 310 so as to enclose outer surfaces of the connecting studs 322, and can prevent the connecting studs 322 of the connecting body 320, which are coupled to the coupling holes 111 and the connecting holes 311 in a penetrated state in order to firmly restrain the frame 110 and the main body 310, from being decoupled.

As shown in FIGS. 3 through 6, the connecting studs 322 of the connecting body 320, which are coupled to the coupling holes 111 of the frame 110 and the connecting holes 311 of the main body 310 in a penetrated state in order to firmly couple the frame 110 and the main body 310, are configured to be located inside the fitting slot 430 of the joint fixture 400, and simultaneously the fixing protrusions 420 are configured to enclose the outer surfaces of the connecting studs 322. Thereby, the connecting studs 322 of the connecting body 320, which are coupled to the coupling holes 111 and the connecting holes 311 in a penetrated state so as to be located inside the main body 310, can maintain a firmly coupled state.

Connecting grooves 322*a* are formed in the outer surface of each connecting stud 322 so as to allow the fixing protrusions 420 of each joint fixture 400 to be fitted into the connecting grooves 322*a*, when the joint fixture 400 is coupled to the insertion groove 314 of the main body 310, and to enclose the outer surfaces of the connecting studs 322.

Thus, when the fixing protrusions 420 are coupled to the connecting studs 322 so as to enclose the outer surfaces of the connecting studs 322, the fixing protrusions 420 are partly placed in the connecting grooves 322*a* of the connecting studs 322, so that the connecting studs 322, coupled to the coupling holes 111 and the connecting holes 311 in a penetrated state, can be efficiently prevented from being decoupled in a horizontal direction away from the coupling holes 111.

Further, in the above description, the connecting studs 322 of the connecting body 320 coupled into the main body 310 are firmly restrained by the coupling of the joint fixture 400. However, according to a choice of the user and a manufacturing environment, the joint fixture 400 may be removed, and the connecting studs 322 may be formed in a wedge shape, and be fixedly inserted into the connecting holes 311 of the main body 310. Insofar as the frame 110 and the main body 310 can be detachably coupled for the firm connection, the main body 310, the connecting body 320, and the joint fixture 400 may be variously modified in shape and configuration.

In the above description, the side panels 100 and the rung members 200 are formed of a high-strength plastic having fire retardancy and innoxiousness. However, without being limited thereto, the tray cover 500, the coupling device 300, and the joint fixture 400 may also be formed of a high-strength plastic having fire retardancy and innoxiousness, so as to increase entire installation efficiency of the cable tray.

Further, in addition to the high-strength plastic having fire retardancy and innoxiousness, the side panel 100, the rung member 200, the coupling device 300, and the joint fixture 400 may, of course, be formed of various high-strength plastics such as polycarbonate and ABS resin. According to a choice of the user, the side panel 100, the rung member 200, the coupling device 300, the joint fixture 400, and the tray cover 500 may be manufactured by conveniently mixing materials of various colors. Thereby, cable trays having various colors are prepared and are selectively used according to a type of the cable, so that it is possible to visually supervise a construction field.

Further, as described above, the side panel 100, the rung member 200, the coupling device 300, and the joint fixture 400 are formed of a high-strength plastic having fire retardancy and innoxiousness. Thereby, a grounding process that is applied to the case of installation of conventional metal cable trays and the resultant fittings is not required. Accordingly, the present invention can prevent unnecessary expenses required to install the fittings.

In the above description, the coupling device of the knockdown cable tray made of a fire-retardant plastic according to the present invention is coupled to one side of the side panel 100. However, without being limited thereto, insofar as the coupling holes 111 can be formed to correspond to the connecting holes 311 of the main body 310 and be firmly restrained by the connecting studs 322 of the connecting body 320 which are coupled to the connecting holes 311, the coupling holes 111 corresponding to the connecting holes 311 may be formed in a side panel 100 made of various materials and having various shapes according to a choice of the user. According to the present invention, a plurality of side panels can be connected by the coupling device of the knockdown cable tray made of a fire-retardant plastic in a firmly restrained and secure state.

As described above, the present invention is adapted to smoothly install and separate the cable tray used for the cable, and can thus provide efficient installation of the cable tray and the resultant reduction in work expenses and time.

Further, the coupling device can be formed of a high-strength plastic having light weight, fire retardancy, and innoxiousness; and the side panel, the rung member, and the tray cover is formed of a high-strength plastic having fire retardancy, and innoxiousness, according to a choice of the user, so that it is possible to secure convenience of use, in addition to installation efficiency.

Although a specific embodiment of the present invention has been described for illustrative purposes, those skilled in the art will appreciate that various modifications, additions and substitutions are possible, without departing from the scope and spirit of the invention as disclosed in the accompanying claims.

What is claimed:

1. A knockdown cable tray made of a fire-retardant plastic, comprising:
   a plurality of side panels installed to be opposite each other;
   a plurality of rung members detachably coupled inside the side panels to firmly support the side panels; and
   a plurality of coupling devices configured to connect the side panels in a lengthwise direction, each of the coupling devices comprising,
   (a) a main body formed to fit into a lengthwise end of each of the side panels, and
   (b) a connecting body configured to firmly fix the main body to the side panels, wherein each of side panels includes:
   (a) a frame comprising a plurality of coupling holes formed in a lengthwise direction, and
   (b) a coupler protruding from the frame and configured to couple to the rung members; and the main body of the coupling devices includes a plurality of connecting holes configured to correspond to the coupling holes of the frame,
   wherein the main body of the coupling devices includes:
   a plurality of first fitting slots formed at opposite sides of the main body and configured to facilitate coupling the main body to the frame; and
   a guide slot formed in a lengthwise direction perpendicular to the first fitting slots, and
   wherein the frame includes a guide protrusion extending from the frame in a lengthwise direction and configured to correspond to the guide slot of the main body of the coupling devices.

2. The knockdown cable tray of claim 1, wherein the connecting body of the coupling devices includes:
   a body part configured to be held with a hand of a user; and
   a plurality of connecting studs protruding from the body part and configured to fit into the coupling holes of the frame and the connecting holes of the main body of the coupling devices.

3. The knockdown cable tray of claim 2, further including:
   a plurality of insertion grooves formed into the main body of the coupling devices; and
   a plurality of joint fixtures removably coupled to the insertion grooves to fix the connecting studs of the connecting body to an inside of the main body of the coupling devices.

4. The knockdown cable tray of claim 3, wherein each of the joint fixtures includes:
   a bar-shaped fixing body;
   a plurality of fixing protrusions extending from one side of the fixing body; and
   a second fitting slot disposed between the fixing protrusions.

5. The knockdown cable tray of claim 4, wherein each of the connecting studs of the connecting body further includes a connecting groove formed in an outer surface of the connecting studs and configured to couple with the fixing protrusions of the joint fixtures.

6. The knockdown cable tray of claim 1, wherein:
   the coupler further includes a fixing groove formed proximate to the frame in the lengthwise direction; and
   each of the rung members further includes a hooking leg formed at opposing ends of the rung members proximate to the frame and configured to insert into the fixing groove of the coupler.

7. A knockdown cable tray made of a fire-retardant plastic, comprising:
- a pair of side panels disposed opposite each other and each including a frame comprising a plurality of coupling holes formed in opposite ends of the frame and a coupler protruding outwardly from the frame, the coupler including,
  - (a) a connecting plate protruding from one side of the frame,
  - (b) a fitting rib protruding upwardly from the connecting plate and formed in a lengthwise direction, and
  - (c) a T-shaped bolt insertion channel formed in a lower end of the connecting plate;
- a plurality of rung members detachably coupled to the coupler to firmly support the pair of side panels; and
- a plurality of coupling devices detachably coupled to the coupling holes of the frame to firmly couple a plurality of side panels disposed in a lengthwise direction.

8. The knockdown cable tray of claim 7, wherein each of the rung members includes:
- a long bar shape; and
- a coupling groove formed in opposing ends of the rung members and configured to couple to the fitting rib of the coupler.

9. The knockdown cable tray of claim 8, wherein each of the coupling devices includes:
- a main body formed to fit into a lengthwise end of the side panels and comprising a plurality of connecting holes configured to correspond to the coupling holes of the frame; and
- a connecting body coupled to the coupling holes and the connecting holes to firmly fix the main body to the side panels.

10. The knockdown cable tray of claim 9, wherein the connecting body of the coupling devices includes:
- a body part configured to be held with a hand of a user; and
- a plurality of connecting studs protruding from one side of the body part and configured to fit into the coupling holes and the connecting holes.

11. The knockdown cable tray of claim 10, further including:
- a plurality of insertion grooves formed in the main body of the coupling devices; and
- a plurality of joint fixtures removably coupled to the insertion grooves to secure the connecting studs of the connecting body to the main body of the coupling devices.

12. A knockdown cable tray made of a fire-retardant plastic, comprising:
- a pair of side panels disposed opposite each other and each including,
  - (a) a frame comprising a plurality of coupling holes formed in opposite lengthwise ends of the frame, and
  - (b) a coupler protruding outwardly from the frame;
- a plurality of rung members detachably coupled to the coupler to firmly support the side panels; and
- a plurality of coupling devices detachably coupled to the coupling holes of the frame to firmly couple a plurality of side panels disposed in a lengthwise direction-,.
- wherein each of the coupling devices includes:
  - a main body formed to fit into an end of the side panels and including a plurality of connecting holes configured to correspond to the coupling holes of the frame; and
  - a connecting body coupled to the coupling holes of the frame and the connecting holes of the main body to firmly fix the main body to the side panels, and
  - wherein the connecting body of the coupling devices includes:
    - a body part; and
    - a plurality of connecting studs protruding from the body part and configured to fit into the coupling holes of the frame and the connecting holes of the main body.

13. The knockdown cable tray of claim 12, wherein the coupler includes a fixing groove formed proximate to the frame in the lengthwise direction.

14. The knockdown cable tray of claim 13, wherein each of the rung members includes a hooking leg formed proximate to the frame and configured to insert into the fixing groove of the coupler.

15. The knockdown cable tray of claim 12, further including:
- a plurality of insertion grooves disposed at opposing sides of the main body; and
- a plurality of joint fixtures disposed in the insertion grooves over the connecting studs to couple the connecting body of the coupling devices to the main body of the coupling devices.

16. The knockdown cable tray of claim 15, wherein each of the joint fixtures includes:
- a bar-shaped fixing body;
- a plurality of fixing protrusions extending from the fixing body; and
- a fitting slot disposed between the fixing protrusions.

17. The knockdown cable tray of claim 16, wherein the connecting studs of the connecting body include a connecting groove formed in an outer surface of the connecting studs and configured to couple to the fixing protrusion of the joint fixtures.

* * * * *